Patented Jan. 1, 1946

2,392,125

UNITED STATES PATENT OFFICE 2,392,125

PURIFICATION OF SULPHATHIAZOLE

Leonard Henry Dhein, Bound Brook, N. J., assignor to American Cyanamid Company, New York, N. Y., a corporation of Maine No Drawing. Application May 5, 1942,
Serial No. 441,861

3 Claims. (Cl. 260—239.6)

This invention relates to an improved process of purifying 2-sulphanilamido thiazole, usually known as sulphathiazole.

Sulphathiazole is normally obtained by the hydrolysis of $N^4$-acetyl sulphathiazole but is too impure for pharmaceutical use. Decolorization and recrystallization from organic solvents are normally employed in order to produce a purified sulphathiazole. This adds considerably to the cost of the process.

According to the present process sulphathiazole is purified without the use of recrystallization from organic solvents by preparing a salt of sulphathiazole with a volatile base such as ammonia, methylamine and the like. The sulphathiazole dissolves up in water as the corresponding salt and can be readily decolorized and clarified. Thereupon the sulphathiazole can be recovered by heating which decomposes the salt and volatilizes the base. The product obtained requires only filtration and washing with cold water and is obtained as a colorless product of high purity.

The preparation of the salt of sulphathiazole and the volatile base may be effected by dissolving crude sulphathiazole in an aqueous solution of the base or a salt of sulphathiazole with a metal such as sodium, potassium, or the like may be prepared and the volatile base salt produced by metathesis. Any suitable salt of the volatile base with a strong acid such as hydrochloric or sulphuric acid may be employed.

The invention will be described in greater detail in conjunction with the following specific examples. The parts are by weight.

*Example 1*

150 parts of wet crude sulphathiazole containing 120 parts of sulphathiazole are dissolved up in 51.9 parts of concentrated ammonia water at a temperature between 30 and 50° C. When solution is complete 100 parts of water and 5 parts of decolorizing carbon are added and the mixture thoroughly clarified followed by filtration. The filtered solution is then subjected to a vacuum of 30-200 mm. until the ammonia distills over at 30-50° C., and the solution ceases to be alkaline to phenolphthalein. The sulphathiazole thus formed precipitates, and after cooling to 20° C. is filtered and washed with cold water until free from ammonia. The filtrate is dried and 102 parts of sulphathiazole melting at 201.5-202.3° C. is obtained. The mother liquors contain some sulphathiazole in solution which is recovered by acidifying with concentrated hydrochloric acid until a pH of 6-7 is reached. 12 additional parts of sulphathiazole are obtained.

*Example 2*

150 parts of wet crude sulphathiazole are dissolved in ammonia water as described in Example 1 and clarified. Thereupon the solution is cooled to 15° C. and the ammonium salt of sulphathiazole crystallizes out. The precipitate is filtered off, washed once with 50 parts of ice cold water, added to 200 parts of water and heated to 30-50° C. under reduced pressure until the ammonia has distilled off and the solution is no longer alkaline to phenolphthalein. A precipitate results, and after cooling is filtered and after drying represents 105 parts of sulphathiazole melting at 201-202° C. The mother liquors on precipitation of the ammonium salt and final precipitation are combined and acidified with hydrochloric acid as described in Example 1.

*Example 3*

The procedure of Example 2 is followed but the ammonium salt of sulphathiazole instead of being subjected to heat under a vacuum in aqueous solution is heated to 70-120° C. in an air dryer until the ammonia has disappeared. The product has a melting point of 201.5-202.4° C., but is slightly colored.

I claim:

1. A method of purifying sulphathiazole which comprises forming an aqueous solution of the salt of the sulphathiazole with a volatile base, decolorizing removing the base by heat and removing precipitated sulphathiazole from the solution.

2. A method of purifying sulphathiazole which comprises forming an aqueous solution of the salt of the sulphathiazole with ammonia, decolorizing removing the ammonia with heat and removing precipitated sulphathiazole from the solution.

3. A method of purifying sulphathiazole which comprises forming an aqueous solution of the salt of the sulphathiazole with ammonia, decolorizing removing the ammonia by heating an aqueous solution of the ammonium salt at 30 to 50° C. under reduced pressure until the ammonia has been removed and then removing the precipitated sulphathiazole from the solution.

LEONARD HENRY DHEIN.